2 Sheets—Sheet 1.

J. E. AUSTIN.
MACHINE FOR EDGING SHINGLES.

No. 171,338. Patented Dec. 21, 1875.

Attest:
Edward Barthel
Wm. P. Spalding.

Inventor:
J. E. Austin
By Atty.
Wm. S. Sprague

N. PETERS, PHOTO-LITHOGRAPHER, WASHINGTON, D.C.

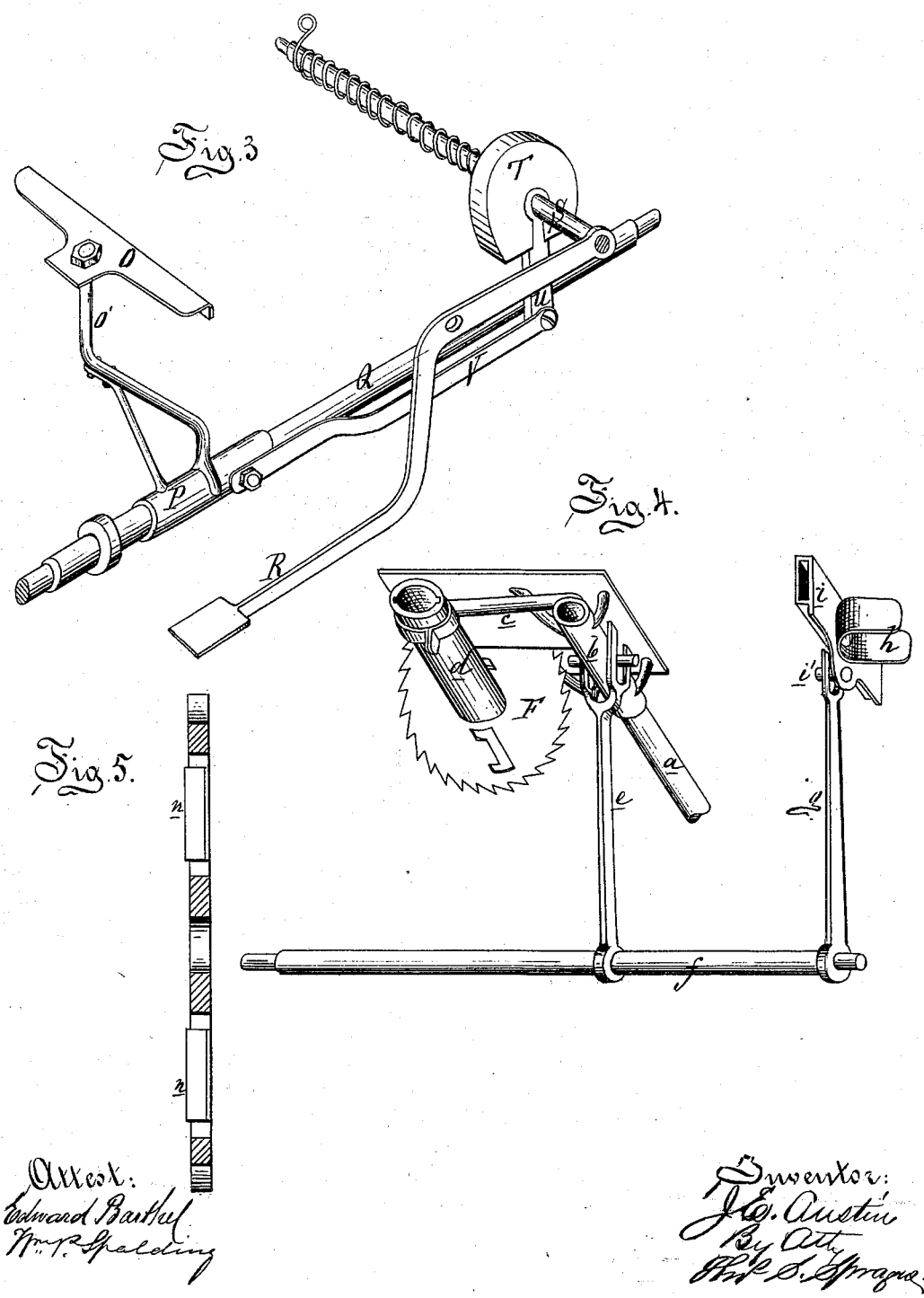

UNITED STATES PATENT OFFICE.

JAMES E. AUSTIN, OF IONIA, MICHIGAN, ASSIGNOR TO THE IONIA SHINGLE-MACHINE MANUFACTURING COMPANY, OF SAME PLACE.

IMPROVEMENT IN MACHINES FOR EDGING SHINGLES.

Specification forming part of Letters Patent No. 171,338, dated December 21, 1875; application filed August 4, 1875.

*To all whom it may concern:*

Be it known that I, JAMES E. AUSTIN, of Ionia, in the county of Ionia and State of Michigan, have invented an Improvement in Machines for Edging Shingles, of which the following is a specification:

The nature of my invention relates to an improvement in machines for trimming shingles so that their sides shall be parallel at right angles with the lower edges; and it consists, first, in the combination of a stationary circular saw and a laterally-adjustable circular saw mounted upon the same arbor, both of the said saws having plane-cutters, as hereinafter described, when the said saws are adapted to edge and plane both sides of a shingle from the under side of the table; second, in the peculiar mechanism for carrying the shingle forward to the saws; in the peculiar mechanism for adjusting the movable saw and its table to the required width of shingle by means of a leg-lever; and, in combination therewith, a pointer for indicating the position of said saw with relation to the stationary saw on the arbor.

Figure 1:
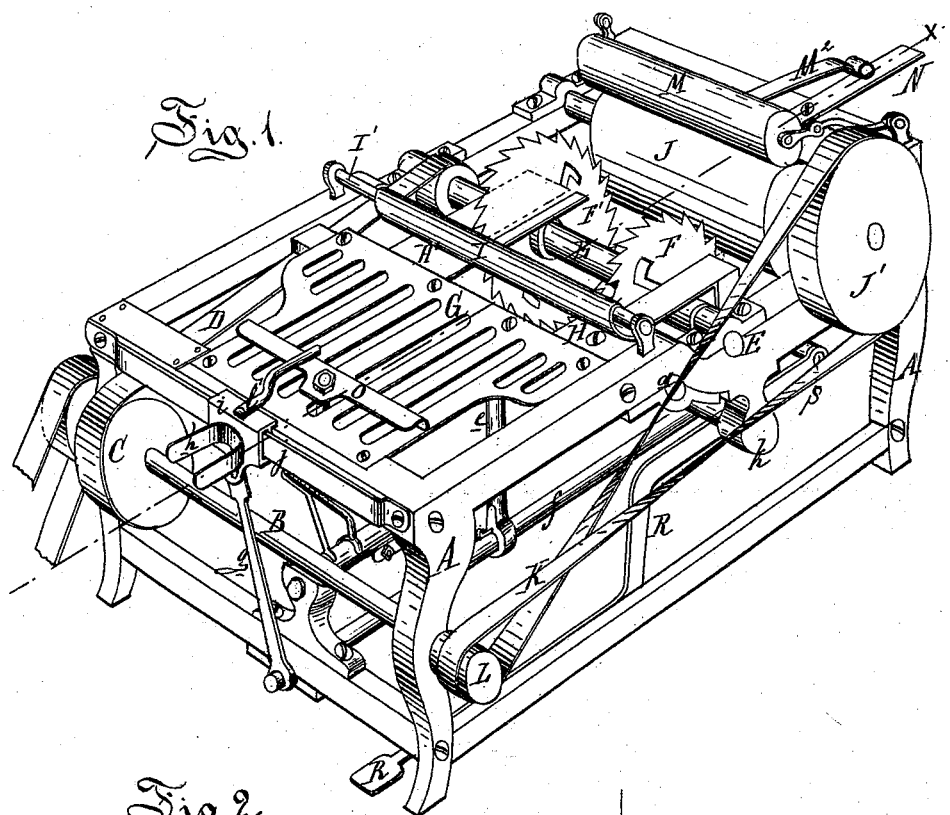
Figure 2:
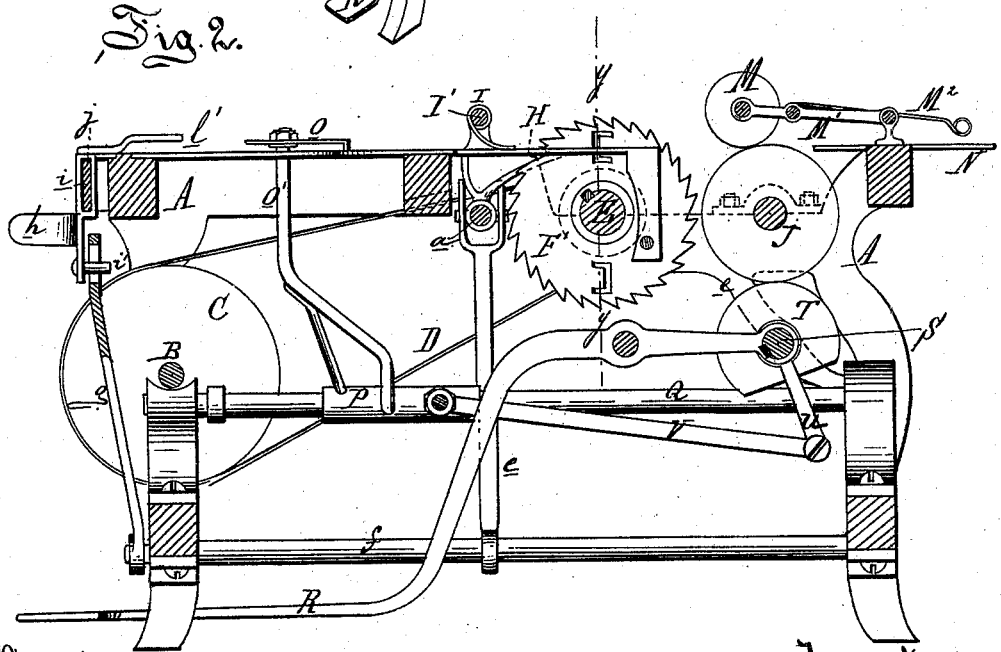

Figure 1, Sheet 1, is a perspective view. Fig. 2 is a longitudinal section at $x\ x$. Fig. 3, Sheet 2, is a detached perspective view of the mechanism which actuates the slide for advancing the shingles to the saws. Fig. 4 is a similar view of the devices for shifting the movable saw. Fig. 5 is a section at $y\ y$.

In the drawing, A represents the frame of the machine, across the front end of which the driving-shaft B is journaled and driven by a belt around a pulley on its projecting end. C is a pulley on the driving-shaft, giving motion to a saw-arbor, E, journaled across the upper part of the frame by means of a belt, D. Near the right-hand end of the arbor is mounted a stationary circular saw, F, to the left of which is a sliding saw, F', whose collar is a sleeve feathered on the arbor. G is a longitudinally-slotted table covering the front half of the frame, behind and under the rear end of which table there is a transverse guide-rod, $a$, in the frame parallel with the saw-arbor. On this rod is a sleeve, $b$, connected, by a bar, $c$, with the sleeve $d$, on which the movable saw is mounted, so that the latter will move to and fro with said sleeve $b$. The latter is moved by a rocker-arm, $e$, on a rock-shaft, $f$, longitudinally journaled in the lower part of the frame, and by a lever, $g$, on its front end said rock-shaft is vibrated on its axis. This is effected by the leg of the operator, which is received in a fork, $h$, on the face of a box-sleeve, $i$, sliding on a bar, $j$, across the top front girt of the frame. At the top of the lever $g$ there is a fork which embraces a pin, $i'$, on the back of the box-slide. It will then be seen that the operator can adjust the movable saw to or from the stationary saw by a lateral movement of his leg, so as to edge shingles of various widths. H is a narrow table secured to the main frame to form a continuation of the right side of the table G. It is slotted for the stationary saw to run through. H' is a similar table, but is movable with the saw F' by reason of its being hung upon the sleeve $b$. I is a curved apron, hung on a rod, I', above and across the saw-tables by short standards at each end, inserted in the frame sides, the purpose of which is to keep the shingle down upon the tables as it slides along under it. J is a feed-roll, journaled across the frame behind the saw-arbor. By means of a belt, K, passing around its pulley J', and a pulley, L, on the driving-shaft, it is revolved so as to draw the shingle back from the saws, the shingles passing under a press-roll, M, hung in a frame, M¹, hinged to posts on the rear corners of the main frame. The shingle passes over a narrow bar, N, projecting rearward from the frame, and is held thereon until pushed off by the succeeding one by a leaf-spring, M², so as to allow the edgings to drop at the sides of the bar N, while the shingle passes on to packing-table before falling off the bar N. The shingle is carried forward from the table G by a T-shaped slide, O, mounted at the top of an arm, O', playing in one of the slots of said table. The lower end of this arm is secured to a sleeve, P, as well as a stiffening brace, which sleeve slides on a rod, Q, longitudinally, secured in the main frame. R is a pedal-lever, hung in the right side of said frame to a pendent lug or hanger, $k$. To its short arm is hung or journaled one end of a shaft, S, whose other end is journaled in a bracket on the left side of the frame. On said shaft S there is keyed a friction-sector, T, and an arm, U, connected, by a rod, V, with the sleeve P. By depressing the pedal the shaft S will be raised up until the sector T is forced against the lower periphery of the feed-roll, which will thereby rotate said shaft S and draw back the arm U, and, through it, the sleeve and slide O, which latter pushes forward a shingle laid in front of it toward the saws. When the pedal is released a spiral torsion-spring on the shaft S rotates it in the opposite direction, moving the slide back to the front end of the table. A pointer, $l'$, on the box-sleeve overhangs the feed-slide O in line with the cut of the movable saw, and indicates to the sawyer the adjustment to be given to said saw in order to edge the shingle properly. The right end of said slide O projects a little to the right of the line of cut of the stationary saw, so that it is only necessary to lay the right edge of the shingle-butt flush with the right end of said slide to insure the edging of the right edge of the shingle.

As is well known, the edges of shingles and lumber when dressed by saws are ragged from the tearing of the fibers by the saw-teeth. In order to plane or smooth these edges I take the saws and cut one or more radial slots in them, carrying these slots back at each end, which leaves a projection in the saw-plate. This projection I give an inward set and bevel the edge from the outside like the end of a plane-iron, which it is then, in fact. This plane-iron I sharpen as required from time to time, and as it projects inwardly from the line of cut of the saw-teeth, acts as a revolving plane to smooth the edges of the shingles as they pass between the saws.

What I claim as my invention is—

1. In a shingle-edging machine, substantially as described, the combination of a stationary circular saw and a laterally-adjustable circular saw mounted upon the same arbor, each of the said saws having plane-cutters formed in the plate, set inwardly toward the other saw and beveled from the outside, when the said saws are adapted to edge and plane both sides of a shingle from the under side of the tables, substantially as described and shown.

2. In a shingle-edging machine, substantially as described, the combination of the slide O, arm O', sleeve P, rod Q, pedal R, shaft S, sector T, arm U, and connecting-rod V with the feed-roll for carrying forward the shingles, substantially as shown and set forth.

3. In a shingle-edging machine, substantially as described, the combination of the guide $d$, sleeve $b$, bar $c$, arm $e$, shaft $f$, lever $g$, box-sleeve $i$, fork $h$, and guide-bar $j$ with the frame A and sleeve of the movable saw for adjusting the latter upon its arbor, substantially as described.

4. The combination of the pointer $l'$ with the box-slide $i$, as and for the purpose set forth.

JAMES E. AUSTIN.

Witnesses:
C. O. THOMPSON,
JAS. F. TOWER.